United States Patent
Zheng et al.

(10) Patent No.: US 10,012,871 B2
(45) Date of Patent: Jul. 3, 2018

(54) LIQUID CRYSTAL DISPLAY PANEL AND LIQUID CRYSTAL DISPLAY APPARATUS

(71) Applicants: Xiamen Tianma Micro-Electronics Co., Ltd., Xiamen (CN); Tianma Micro-Electronics Co., Ltd., Shenzhen (CN)

(72) Inventors: Binyi Zheng, Xiamen (CN); Ling Wu, Xiamen (CN); Poping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/596,516

(22) Filed: May 16, 2017

(65) Prior Publication Data

US 2017/0248813 A1 Aug. 31, 2017

(30) Foreign Application Priority Data

Oct. 31, 2016 (CN) .......................... 2016 1 0933432

(51) Int. Cl.
G02F 1/1339 (2006.01)
G02F 1/1335 (2006.01)
G02F 1/1368 (2006.01)
G02F 1/1333 (2006.01)

(52) U.S. Cl.
CPC ........ *G02F 1/13394* (2013.01); *G02F 1/1368* (2013.01); *G02F 1/133377* (2013.01); *G02F 1/133512* (2013.01); *G02F 1/133514* (2013.01); *G02F 2001/13396* (2013.01)

(58) Field of Classification Search
CPC .................. G02F 1/13396; G02F 1/13394
See application file for complete search history.

(56) References Cited

U.S. PATENT DOCUMENTS

2007/0165179 A1* 7/2007 Jang .................... G02F 1/13394
349/156
2009/0073371 A1* 3/2009 Takeda .............. G02F 1/133509
349/156

FOREIGN PATENT DOCUMENTS

| CN | 100368874 C | 2/2008 |
| CN | 101546071 A | 9/2009 |
| CN | 202453603 U | 9/2012 |

* cited by examiner

*Primary Examiner* — Phu Vu
(74) *Attorney, Agent, or Firm* — Anova Law Group, PLLC (57) ABSTRACT

An LCD panel and an LCD apparatus are provided. The LCD panel comprises a first substrate, a second substrate, a plurality of supporters disposal between the first substrate and the second substrate and configured to support the first substrate and the second substrate, a plurality of liquid crystals filling a space formed by the first substrate, the second substrate, and the plurality of supporters, a plurality of buffers disposed between adjacent supporters, and a black matrix disposed on the second substrate. The plurality of the supporters includes a plurality of first supporters and a plurality of second supporters. In a direction perpendicular to at least one of the first substrate and the second substrate, a second supporter has a height smaller than a first supporter, and a buffer has a height smaller than the first supporter.

15 Claims, 11 Drawing Sheets

LIQUID CRYSTAL DISPLAY PANEL AND LIQUID CRYSTAL DISPLAY APPARATUS

CROSS-REFERENCES TO RELATED APPLICATIONS

This application claims the priority of Chinese Patent Application No. CN201610933432.7, filed on Oct. 31, 2016, the entire contents of which are incorporated herein by reference.

FIELD OF THE DISCLOSURE

The present disclosure generally relates to the display technology and, more particularly, relates to a liquid crystal display panel and a liquid crystal display apparatus.

BACKGROUND

As science and technology continuously advance, liquid crystal display (LCD) screens become part of daily life. Currently, in the LCD screen design, a plurality of photo spacers are often disposed in each pixel unit as a support structure, which suppress the light leakage when the LCD screens are squeezed or pressed. When an existing LCD screen is pressed by an external force, liquid crystals are pushed toward peripherals of the LCD screen. When the external force is removed, the liquid crystals return to the middle of the LCD screen. As a result, the liquid crystals may oscillate and form a ripple.

Thus, a technical solution of suppressing the light leakage when squeezing the photo spacers and the liquid crystal ripple is highly desired.

The disclosed LCD panel and LCD apparatus are directed to solve one or more problems set forth above and other problems.

BRIEF SUMMARY OF THE DISCLOSURE

One aspect of the present disclosure provides a LCD panel, comprising a first substrate, a second substrate, a plurality of supporters disposed between the first, substrate and the second substrate and configured to support the first substrate and the second substrate, a plurality of liquid crystals filling a space formed by the first substrate, the second substrate, and the plurality of supporters, a plurality of buffers disposed between adjacent supporters, and a black matrix disposed on the second substrate. The plurality of the supporters includes a plurality of first supporters and a plurality of second supporters. In a direction perpendicular to at least one of the first substrate and the second substrate, a second supporter has a height smaller than a first supporter. In the direction perpendicular to at least one of the first substrate and the second substrate, a buffer has a height smaller than the first supporter. An orthogonal projection of the black matrix onto at least one of the first substrate and the second substrate covers an orthogonal projection of the plurality of buffers onto at least one of the first substrate and the second substrate.

Another aspect of the present disclosure provides a LCD apparatus comprising the disclosed LCD panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present disclosure and not to limit the present invention. In addition, it should also be noted that, for ease of description, only part, but not all, of the structures associated with the present invention are shown in the accompanying drawings. All other embodiments obtained by those skilled in the art without making creative work are within the scope of the present invention.

The present disclosure will now be described in detail with reference to the accompanying drawings. When illustrating the embodiments of the present disclosure, certain areas of the schematic views of the device structures may be disproportionally enlarged for the convenience of illustration. In addition, the three-dimensional sizes including the length, width, and depth should be included in the actual implementation of the present disclosure.

The present disclosure provides a liquid crystal display (LCD) panel, which may include a first substrate, a second substrate, a plurality of supporters disposed between the first substrate and the second substrate and configured to separate and support the first substrate and the second substrate, a plurality of liquid crystals filling a space formed by the first substrate, the second substrate, and the plurality of the supports, a plurality of buffers disposed between adjacent supporters, and a black matrix disposed on the second substrate.

A supporter may include a first supporter and a second supporter, and the second supporter may have a height, in a direction perpendicular to the surface of at least one of the first substrate and the second substrate, smaller than the second supporter. The buffers may be disposed between the first supporter and the second supporter, and the buffer may have a height, in the direction perpendicular to the surface of at least one of the first substrate and the second substrate, smaller than the first supporter.

The buffers may be configured to block the flow of liquid crystals. An orthogonal projection of the black matrix onto the surface of at least one of the first substrate and the second substrate may cover the orthogonal projection of the buffers onto the surface, of at least one of the first substrate and the second substrate. Thus, the disclosed LCD panel may use the buffers to block the flow of liquid crystals, thereby reducing the liquid crystal ripple without introducing extra supporters.

Figure 1:
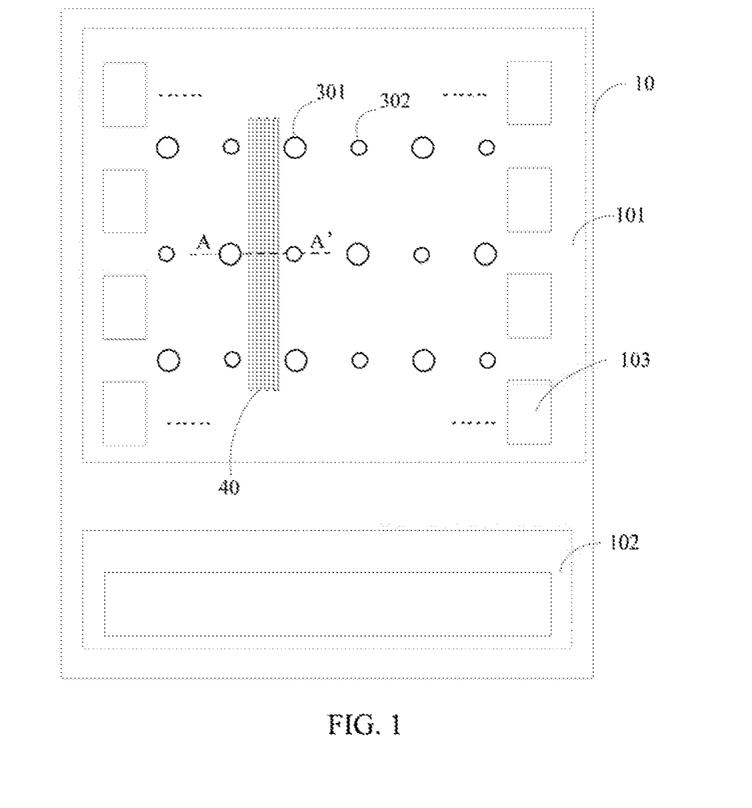
FIG. 1 illustrates a schematic view of an exemplary LCD panel according to the disclosed embodiments.
Figure 2:
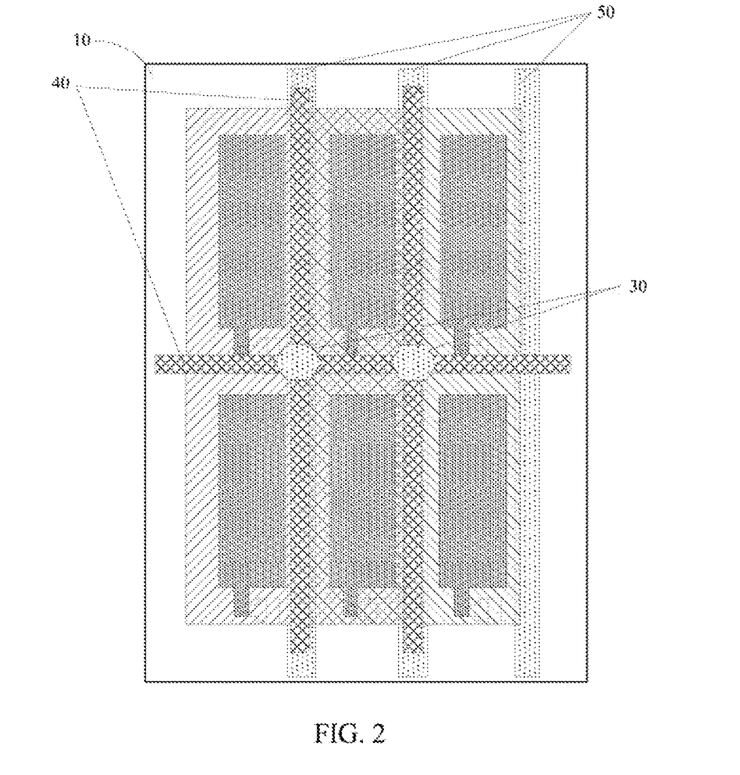
FIG. 2 illustrates a partial view of an exemplary display region of an exemplary LCD panel in FIG. 1 according to the disclosed embodiments.
Figure 3:
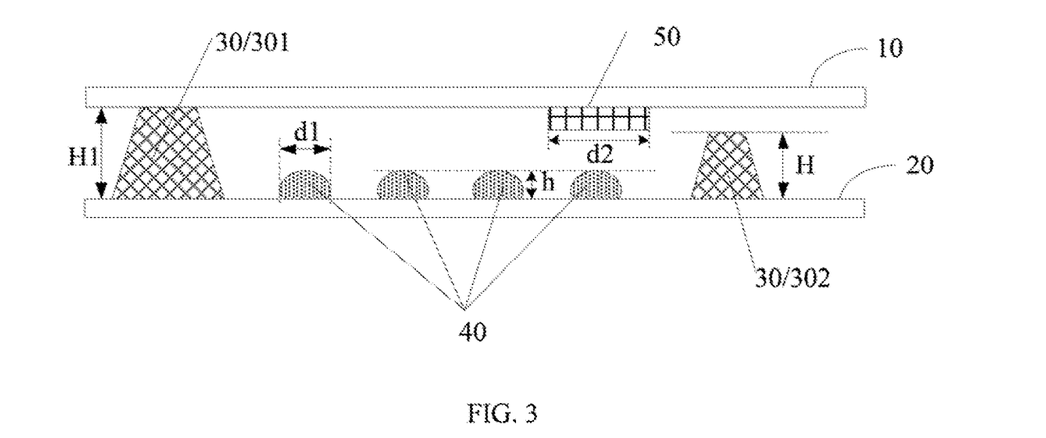
FIG. 3 illustrates an AA' sectional view of an exemplary LCD panel in FIG. 1 according to the disclosed embodiments.

FIG. 1 illustrates a schematic view of an exemplary LCD panel according to the disclosed embodiments. FIG. 2 illustrates a partial view of an exemplary display region of an exemplary LCD panel in FIG. 1 according to the disclosed embodiments. FIG. 3 illustrates an AA' sectional view of an exemplary LCD panel in FIG. 1 according to the disclosed embodiments. As shown in FIG. 1, FIG. 2, and FIG. 3, the LCD panel may include a first substrate 10, a second substrate 20, a plurality of liquid crystals sandwiched between the first substrate 10 and the second substrate 20, a plurality of supporters 30, a plurality of buffers 40, and a black matrix 50.

Referring to FIG. 1, the first substrate 10 may include a display region 101 and a non-display region 102. The display region 101 may include a plurality of pixel units 103, and a plurality of supporters 30. The plurality of supporters 30 may include a plurality of first supporters 301 and a plurality of second supporters 302.

In particular, as shown in FIG. 3, the plurality of the supporters 30 may be disposed between the first substrate 10 and the second substrate 20 to separate the first substrate 10 from the second substrate 20 and, meanwhile, support the first substrate 10 and the second substrate 20. Thus, the liquid crystals may be able to fill the space formed by the first substrate 10, the second substrate 20, and the supporters 30.

In the disclosed embodiments, the supporters 30 may include the first supporters 301 and the second supporters 302. In a direction perpendicular to the surface of at least one of the first substrate 10 and the second substrate 20, the second supporter 302 may have a height H smaller than the first supporter 301.

The buffers 40 may be disposed between the first supporters 301 and the second supporters 302. In the direction perpendicular to the surface of at least one of the first substrate 10 and the second substrate 20, the buffer 40 may have a height h smaller than the first supporter 301. The buffers 40 may be configured to block the flow of liquid crystals.

In certain embodiments, the black matrix 50 may be disposed on the first substrate 10. The black matrix 50 may include a plurality of the black matrix stripes. An orthogonal projection of the black matrix 50 onto the surface of at least one of the first substrate 10 and the second substrate 20 may cover an orthogonal projection of the buffers 40 onto the surface of at least one of the first substrate 10 and the second substrate 20. That is, the width d1 of the buffer 40 may be configured to be smaller than the width d2 of the stripe of the black matrix 50.

Figure 4:
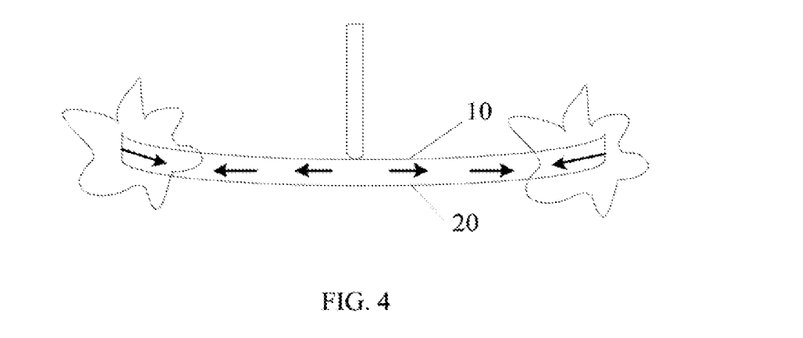
FIG. 4 illustrates a schematic view of a liquid crystal flow when pressing an existing LCD panel.

FIG. 4 illustrates a schematic view of a liquid crystal flow when pressing an existing LCD panel. As shown in FIG. 4, the existing LCD panel includes a first substrate 10, a second substrate 20, and a plurality of liquid crystals filling the space between the first substrate 10 and the second substrate 20. When the LCD panel is pressed, the plurality of the liquid crystals may move in a direction as indicated by an arrow in FIG. 4. When the liquid crystal molecules are gathered at both ends of the LCD panel, ripples may appear.

Figure 5:
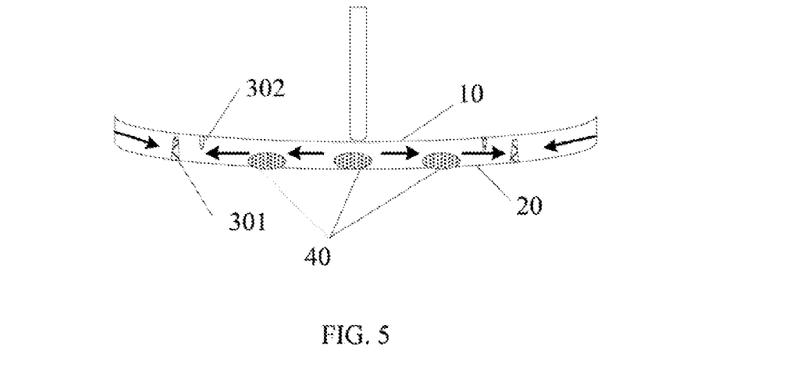
FIG. 5 illustrates a schematic view of a liquid crystal flow when pressing an exemplary LCD panel according to the disclosed embodiments.

FIG. 5 illustrates a schematic view of a liquid crystal flow when pressing an exemplary LCD panel according to the disclosed embodiments. As shown in FIG. 5, to resolve the problem of the liquid crystal ripples when the existing LCD panel in FIG. 4 is pressed, the buffers 40 may be introduced into the disclosed LCD panel. When the plurality of the liquid crystals are pushed to move away from the original position, the buffers 40 may block the movement of the liquid crystals, thereby suppressing the liquid crystal ripples.

That is, in the disclosed embodiments, through introducing the buffers 40, the movement of the liquid crystals may be blocked and, thus, the liquid crystal ripples generated in the movement of the liquid crystals may be reduced while extra supporters 301 and 302 may not be employed.

The height of the supporter 40 may be determined according to various application scenarios. In one embodiment, as shown in FIG. 3, in the direction perpendicular to the surface of at least one of the first substrate 10 and the second substrate 20, the buffers 40 may have a height h smaller than the second supporters 302. Thus, the buffers 40 may be able to block the movement of the liquid crystals, while allowing the liquid crystal movement required for the normal operation of the display panel, instead of completely blocking the liquid crystal movement.

Further, the arrangement or the distribution, and the structure of the buffers 40 may vary according to various application scenarios. Certain examples will be explained in FIGS. 6-13.

Figure 6:
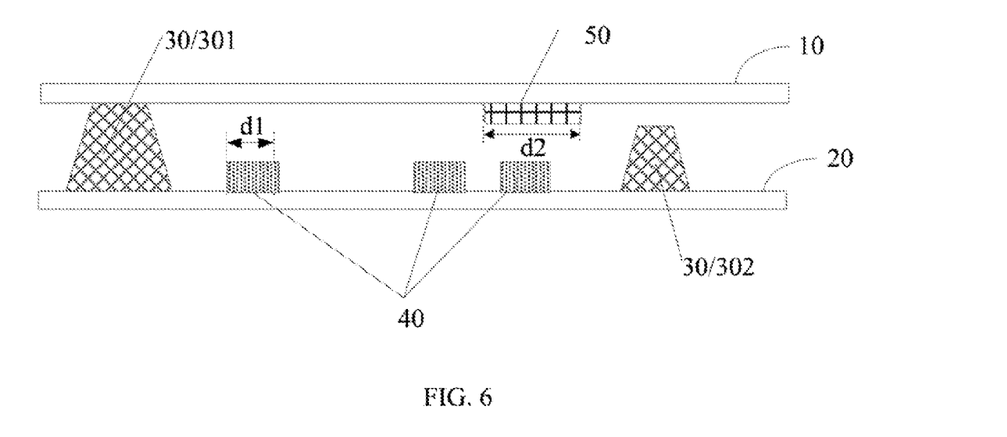
FIG. 6 illustrates a cross-sectional view of another exemplary LCD panel according to the disclosed embodiments.

FIG. 6 illustrates a cross-sectional view of another exemplary LCD panel according to the disclosed embodiments. The similarities between FIG. 3 and FIG. 6 are not repeated here, while certain differences will be explained.

As shown in FIG. 6, the LCD panel may include a first substrate 10, a second substrate 20, and liquid crystals filling the space between the first substrate 10 and the second substrate 20. The LCD panel may also include a plurality of first supporters 301, a plurality of second supporters 102, and a black matrix 50.

As shown in FIG. 6, in a direction perpendicular to the surface of at least one of the first substrate 10 and the second substrate 20, the buffer 40 may have a rectangular cross-section, while the buffers 40 in FIG. 3 may have an oval cross-section. In the disclosed embodiments, the buffers 40 may have other cross-sectional shape, such as circle, triangle, circular sector, and other appropriate shapes. Further, the width d1 of the buffer 40 may be configured to be smaller than the width d2 of the stripe of the black matrix 50.

Figure 7:
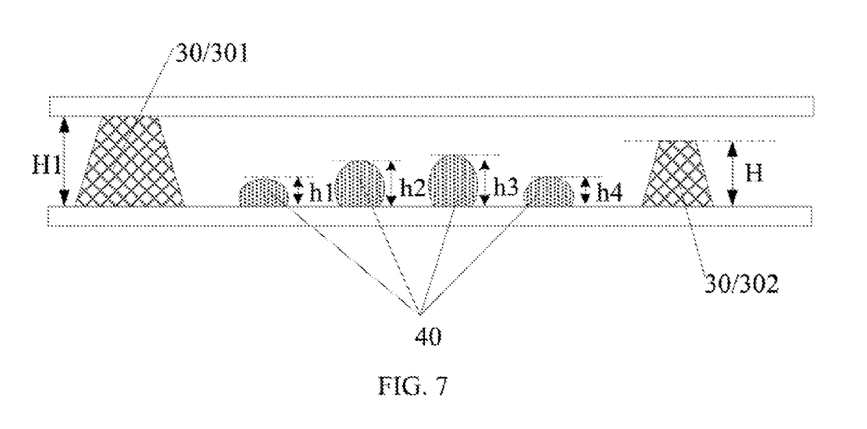
FIG. 7 illustrates a cross-sectional view of another exemplary LCD panel according to the disclosed embodiments.

FIG. 7 illustrates a cross-sectional view of another exemplary LCD panel according to the disclosed embodiments. The similarities between FIG. 3 and FIG. 7 are not repeated here, while certain differences will be explained.

As shown in FIG. 7, a plurality of buffers 40 may be disposed between the first supporter 301 and the second supporter 302. In the direction perpendicular to the surface of at least one of the first substrate and the second substrate, at least one of the buffers 40 may have a height different from the rest of buffers 40. That is, $h1 \neq h2 \neq h3 \neq h4$. Because the liquid crystals at different positions of the LCD panel may have different flow rates, through configuring the buffers 40 at different positions to have different heights, the flow rates of the liquid crystals at the different positions may be uniformly reduced. That is, the flow rates of the liquid crystals at the different positions may be balanced. For example, the buffer 40 at the position with a higher liquid crystal flow rates of the liquid crystals may be configured to have a higher height, and the buffer 40 at the positions with a lower liquid crystal flow rate may be configured to have a lower height.

In one embodiment, as shown in FIG. 7, $h1<h4<h2<h3$, and all the buffers 40 may be disposed on the same substrate, for example, the second substrate 302 in FIG. 7.

In another embodiment, the buffers may be disposed on different substrates. A corresponding structure is shown in FIG. 8.

Figure 8:
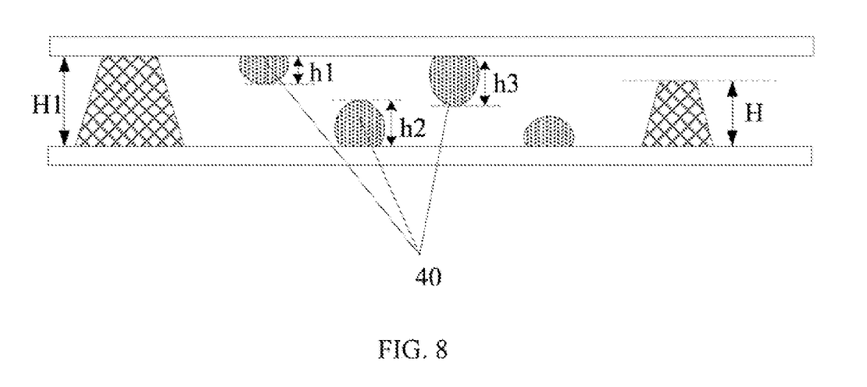
FIG. 8 illustrates a cross-sectional view of another exemplary LCD panel according to the disclosed embodiments.

FIG. 8 illustrates a cross-sectional view of another exemplary LCD panel according to the disclosed embodiments. As shown in FIG. 8, $h1<h2<h3$, and the buffers 40 may be disposed on both the first substrate and the second substrate.

It should be noted that, the distribution patterns of the buffers 40 are not limited by the present disclosure. Those skilled in the art may determine the distribution patterns of the buffers according to the actual fabrication and design requires without departing from the scope of the present disclosure.

Figure 9:
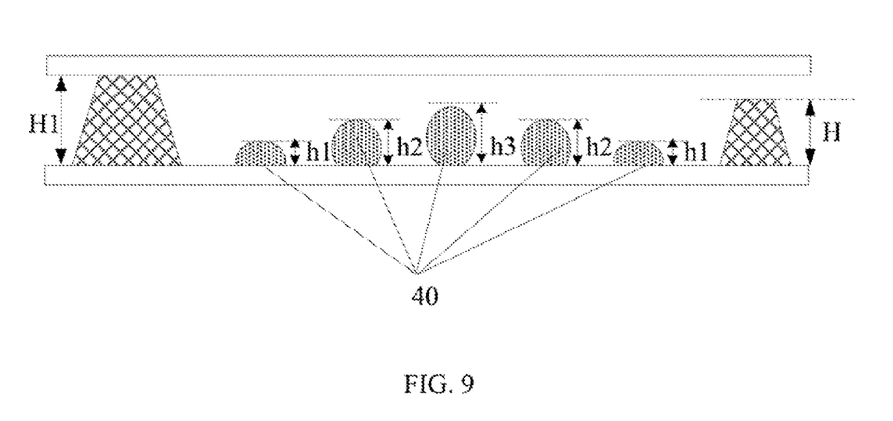
FIG. 9 illustrates a cross-sectional view of another exemplary LCD panel according to the disclosed embodiments.

FIG. 9 illustrates a cross-sectional view of another exemplary LCD panel according to the disclosed embodiments. As shown in FIG. 9, a plurality of buffers 40 may be disposed on at least one of the first substrate and the second substrate. On at least one of the first substrate and the second substrate, from a pre-determined position to the periphery, the height of the buffers 40 may be gradually reduced. For example, the pre-determined positions may be the center of at least one of the first substrate and the second substrate.

In one embodiment, as shown in FIG. 9, the buffers 40 at the center position of the substrate may be configured to have a higher height than the buffers 40 at the peripheral positions. Because the liquid crystals are more easily accumulated in the middle of the LCD panel, through configuring the height of the buffers 40 to gradually decrease from the center positions to the peripheral positions, excessive accumulation of liquid crystals in the middle of the LCD panel may be prevented. FIG. 9 may only show the cross-sectional view in one direction, and $h3>h2>h1$. The heights of the buffers 40 may gradually decrease from the center to the left and from the center to the right.

In the exemplary LCD display panels shown in FIGS. 7-9, the buffers may have different heights. In another embodiment, as shown in FIG. 3, the buffers 40 may have a same height. That is, a plurality of buffers 40 may be disposed between the first supporter 301 and the second supporter 302. In the direction perpendicular to the surface of at least one of the first substrate 10 and the second substrate 20, the buffer 40 may have the same height h.

In certain embodiments, the first substrate may be an array substrate, and the second substrate may be a color film substrate. The buffers may be made of an organic material, such as polystyrene or photoresist, which is not limited by the present disclosure.

FIG. 10, FIG. 11, FIG. 12, and FIG. 13 illustrate schematic views of exemplary buffer arrangements in an exemplary display region of an exemplary LCD panel according to the disclosed embodiments.

Figure 10:
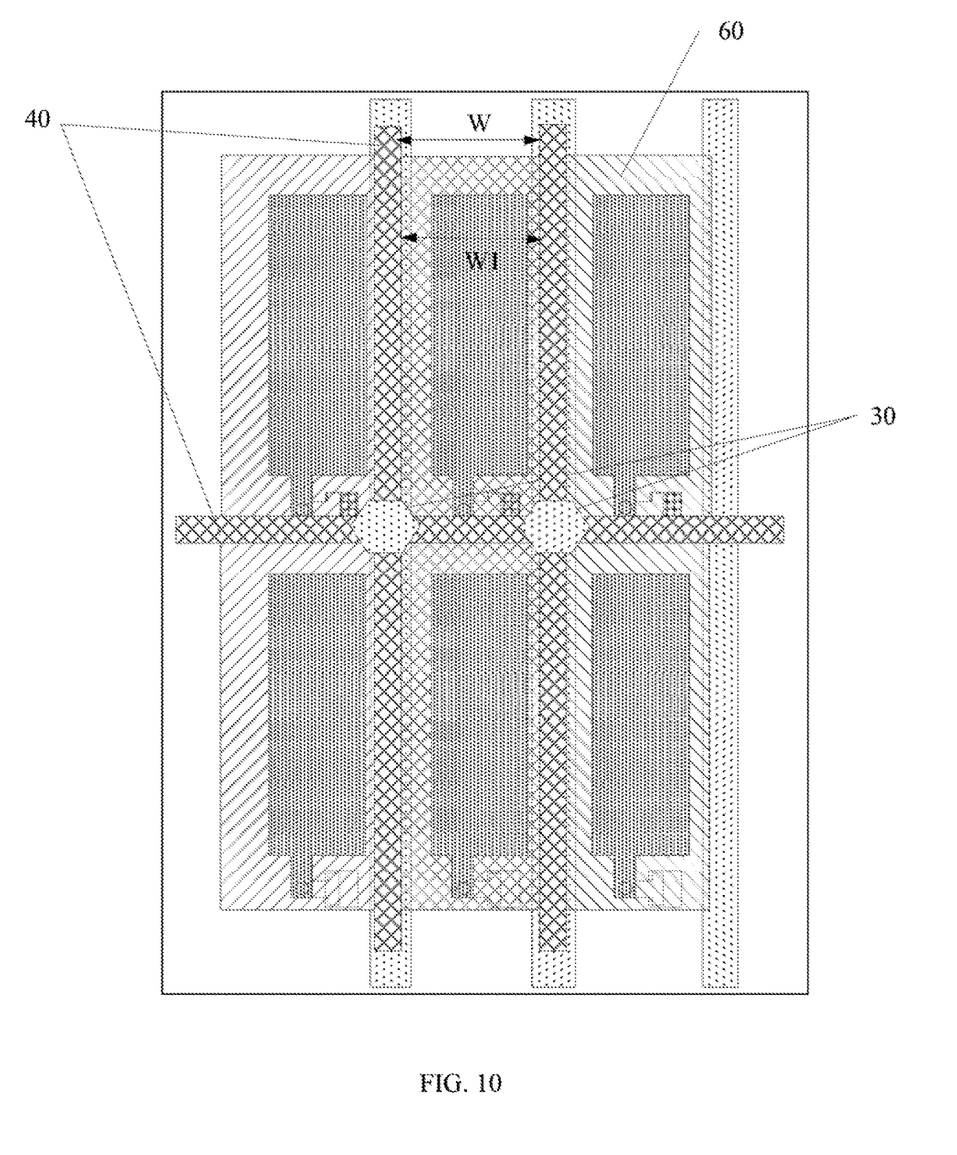
FIG. 10 illustrates an exemplary buffer distribution in a display region of an exemplary LCD panel according to the disclosed embodiments.
Figure 12:
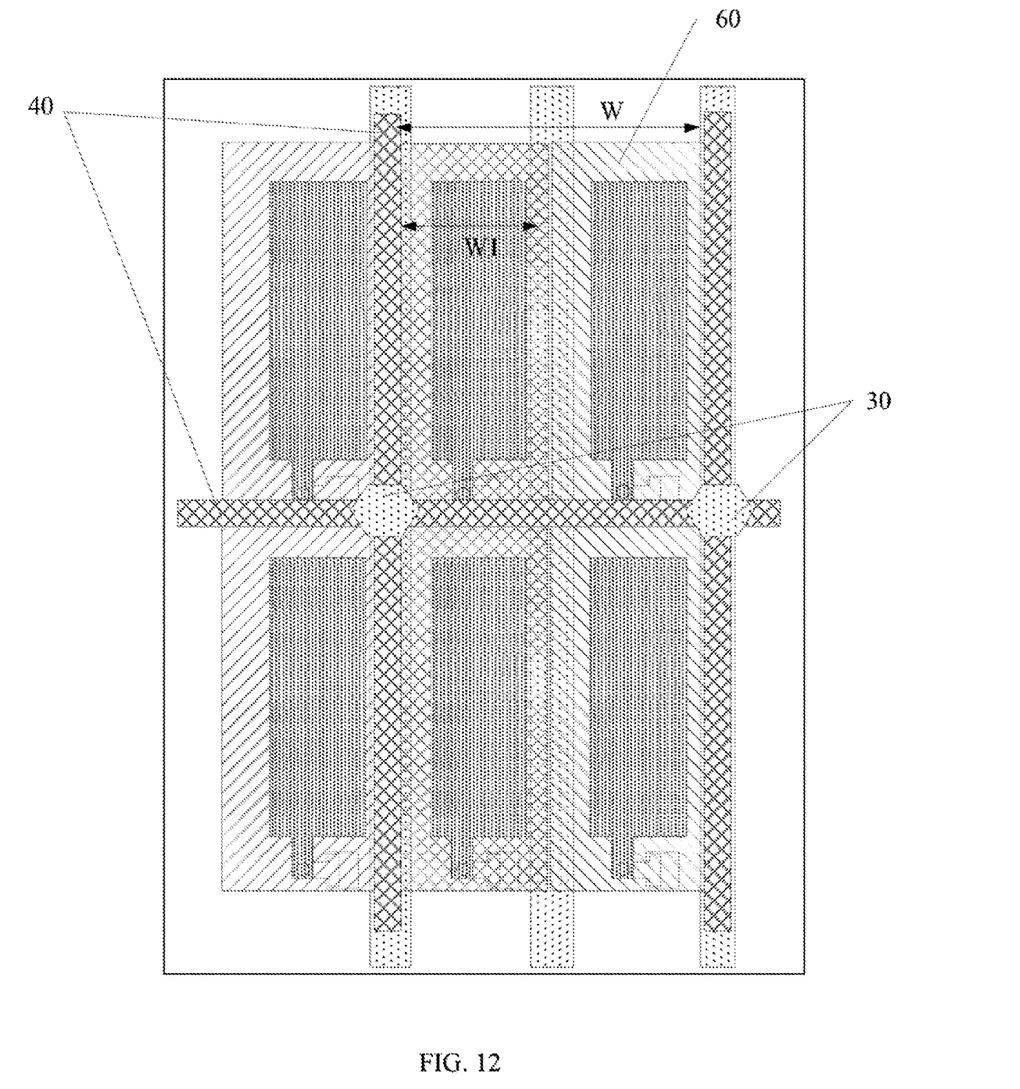
FIG. 12 illustrates another exemplary buffer distribution in a display region of an exemplary LCD panel according to the disclosed embodiments.

As shown in FIG. 10 and FIG. 12, on a plane, parallel to at least one of the first substrate and the second substrate, the buffer 40 may have a striped shape. A distance or width between two adjacent buffers 40 in parallel may be greater than or equal to a width of one sub-pixel 60. For example, in one embodiment, as shown in FIG. 10, the distance or width W between two adjacent buffers 40 in parallel may be configured to be equal to the width W1 of one sub-pixel 60.

In another embodiment, as shown in FIG. 12, the distance or width W between two adjacent buffers 40 in parallel may be configured to be greater than the width W1 of one sub-pixel 60, and $W=2W1$. The distance or width between two adjacent buffers 40 in parallel may be determined according to the actual fabrication and design requirements, and is not limited by the present disclosure.

Further, as shown in FIG. 10 and FIG. 12, on a plane parallel to at least one of the first substrate and the second substrate, the buffers 40 each having a striped shape may be intersected with each other. The supporters 30 may be disposed in at least one of the intersections. That is, the buffers 40 and the supporters 30 may be intersected with each other.

Figure 11:
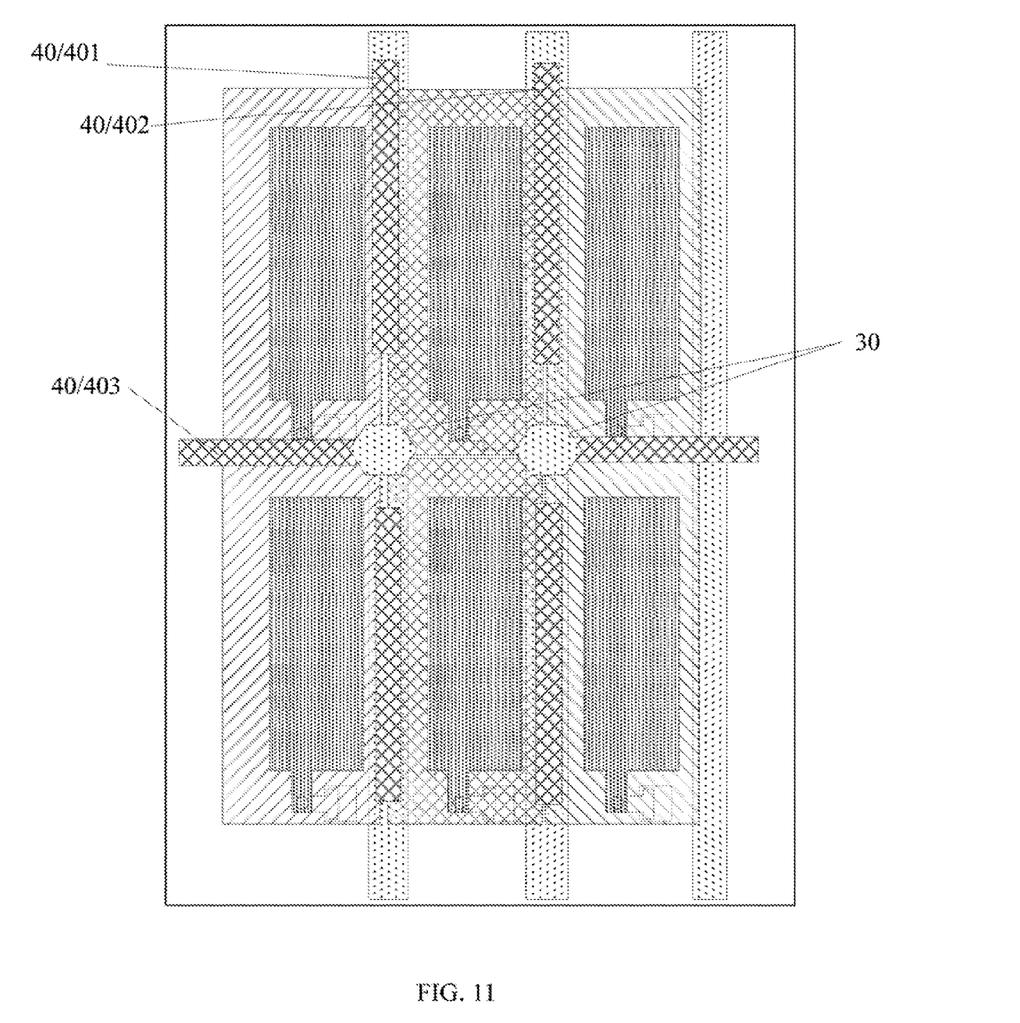
FIG. 11 illustrates another exemplary buffer distribution in a display region of an exemplary LCD panel according to the disclosed embodiments.
Figure 13:
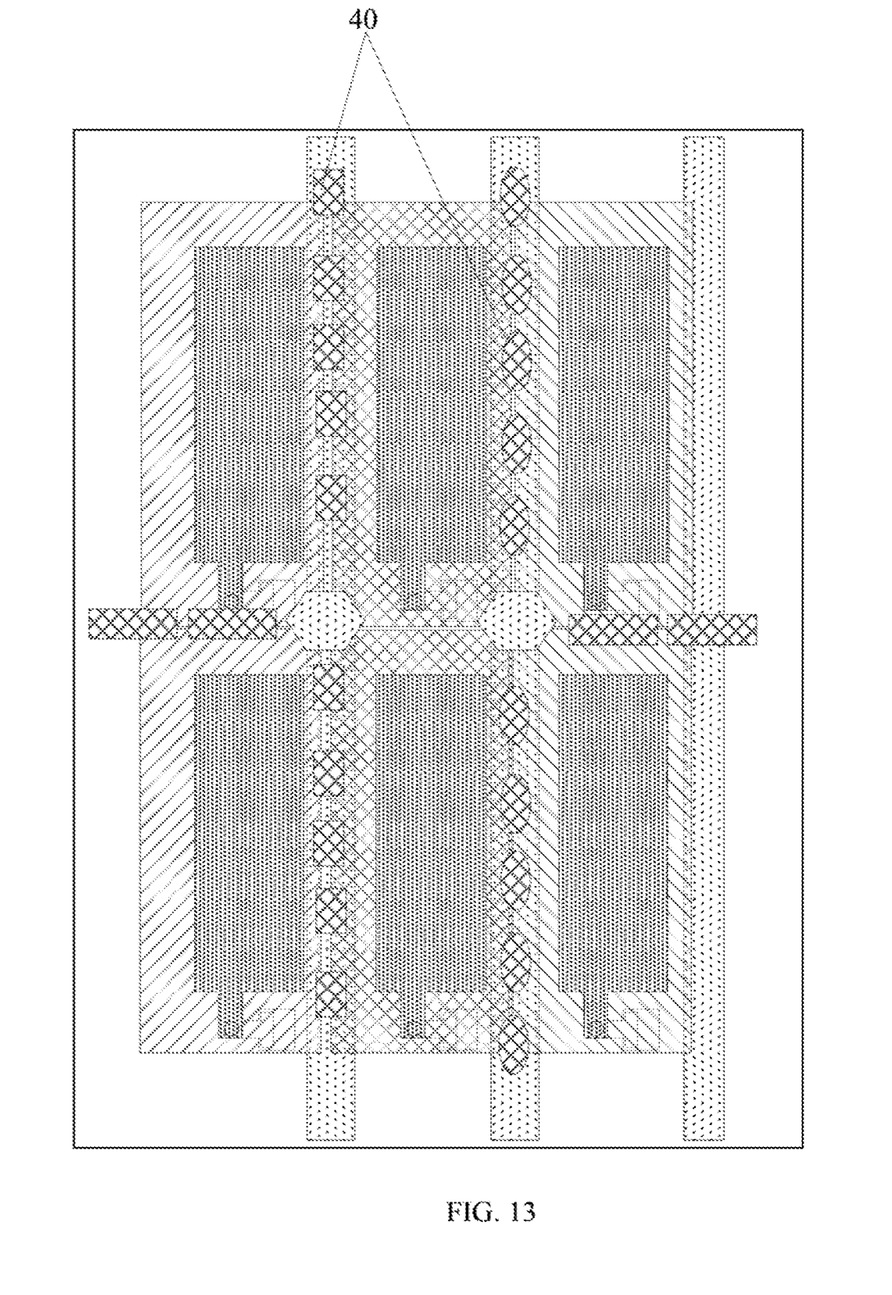
FIG. 13 illustrates another exemplary buffer distribution in a display region of an exemplary LCD panel according to the disclosed embodiments.

FIG. 11 and FIG. 13 illustrate schematic views of buffer distribution in the display region of an exemplary LCD panel according to the disclosed embodiments. As shown in FIG. 11 and FIG. 13, on a plane parallel to at least one of the first substrate and the second substrate, the buffers 40 may have a pre-determined gap between some of the buffers 40 and the supporters 30, and between the buffers 40. As shown in FIG. 11 and FIG. 13, neither the buffers 401 nor the buffers 402 may intersect with the buffers 403, and the buffers 401, 402 and 403 may be broken into separate sections.

Further, in one embodiment, the buffer 40 may be provided with a continuous striped shape, as shown in FIG. 10. In another embodiment, the buffer 40 may be provided with an island shape. As shown in FIG. 13, on a plane parallel to at least one of the first substrate and the second substrate, the buffer 40 may be provided with a dotted shape. The dot may be a circular dot, square dot, or any other appropriate dot shapes, which is not limited by the present disclosure. Further, the plurality of buffers 40 may have a same shape or different shapes. The buffer 40 may have any appropriate shapes, which is not limited by the present disclosure.

Figure 14:
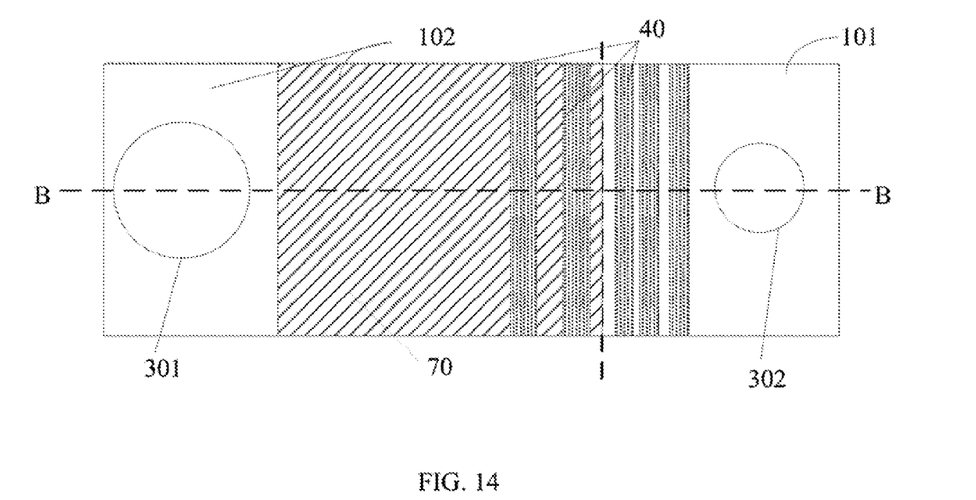
FIG. 14 illustrates a schematic view of an exemplary non-display region in an exemplary LCD panel according to the disclosed embodiments.
Figure 15:
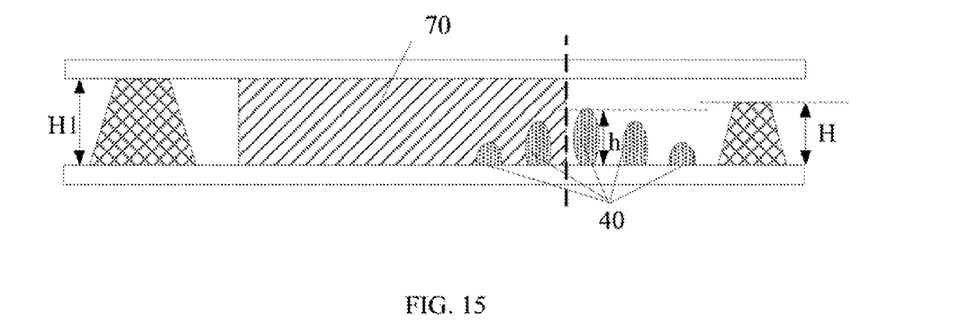
FIG. 15 illustrates a BB sectional view of an exemplary LCD panel in FIG. 14 according to the disclosed embodiments.
Figure 16:
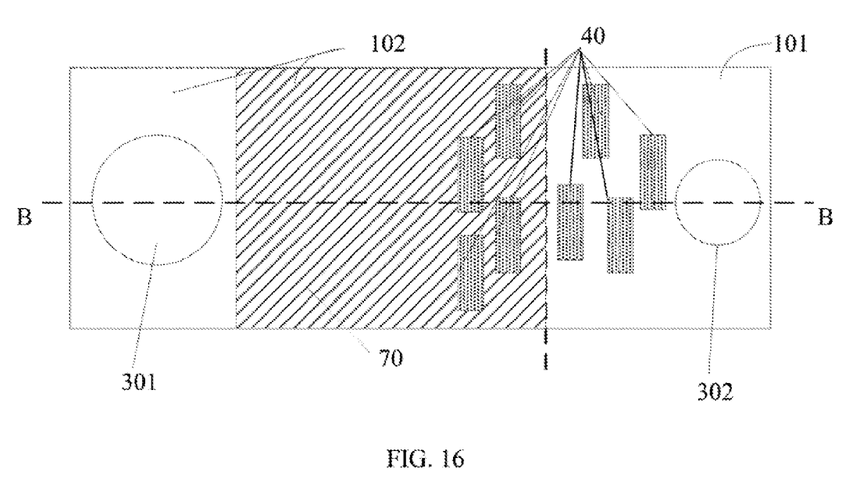
FIG. 16 illustrates a schematic view of another exemplary non-display region in an exemplary LCD panel according to the disclosed embodiments.
Figure 17:
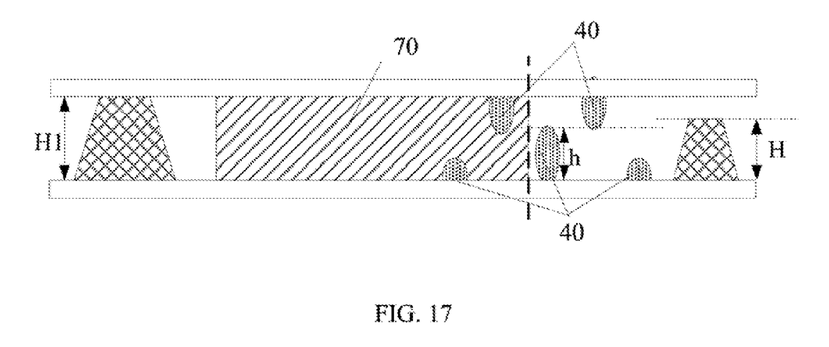
FIG. 17 illustrates a BB cross-sectional view of an exemplary LCD panel in FIG. 16 according to the disclosed embodiments.

In certain embodiments, the buffers may be disposed in at least one of the display region and the non-display region of the first substrate. Certain examples are shown in FIGS. 14-17. FIG. 14 illustrates a schematic view of an exemplary non-display region in an exemplary LCD panel according to the disclosed embodiments. FIG. 15 illustrates a BB sectional view of an exemplary LCD panel in FIG. 14 according to the disclosed embodiments. FIG. 16 illustrates a schematic view of another exemplary non-display region in an exemplary LCD panel according to the disclosed embodiments. FIG. 17 illustrates a BB cross-sectional view of an exemplary LCD panel in FIG. 16 according to the disclosed embodiments.

As shown in FIG. 14, the buffer 40 may be provided with a continuous striped shape, and disposed near the boundary between the display region 101 and the non-display region 102. A sealant 70 may be disposed at the boundary between the display region 101 and the non-display region 102. Through disposing the buffers 40 at the boundary, the liquid crystals in the display region 101 may be effectively prevented from spilling over to the non-display region 102, and vice versa. Further, a process improvement may be achieved in the coating process of frail c sealant and polyimide (PI) liquid for LCD panels with narrow frames. In addition, the buffers 40 may include a plurality of separated sections, as shown in FIG. 16. The separated section may have a striped shape, an island shape, or any other appropriate shapes.

Further, the present disclosure also provides a LCD apparatus, comprising the disclosed LCD panel. FIG. 1 illustrates an exemplary LCD apparatus according to the disclosed embodiments.

Figure 18:
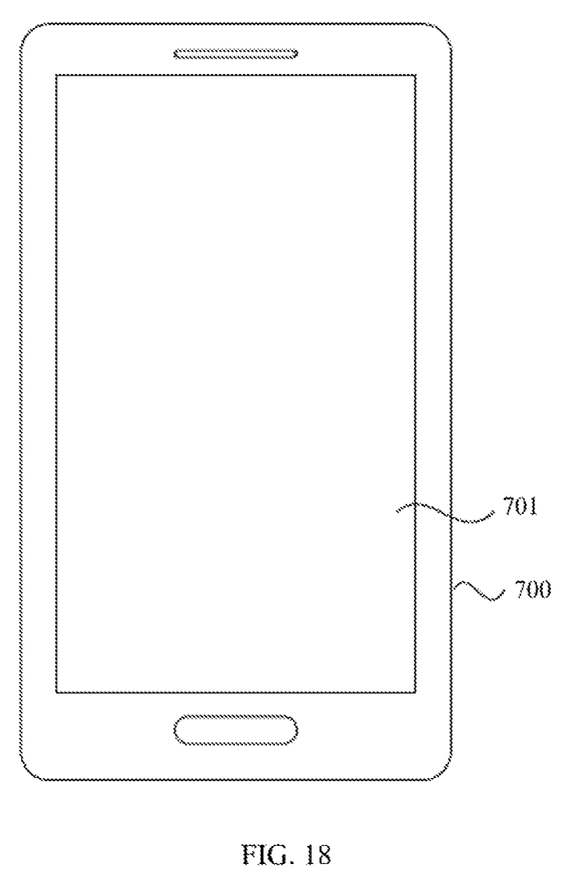
FIG. 18 illustrates an exemplary LCD apparatus according to the disclosed embodiments.

As shown in FIG. 18, the LCD apparatus 700 may include a LCD panel 701. The LCD panel 701 may be any one of the disclosed LCD panel. The LCD apparatus 700 may be a smart phone, a smart watch, a VR goggle, a smart hand band, an electronic paper, a television set, an automotive display, a notebook computer, a tablet computer, or any devices having a display panel, which is not limited by the present disclosure.

The present disclosure provides a LCD panel. The LCD panel may comprise a first substrate, a second substrate, a plurality of supporters disposed between the first substrate and the second substrate and configured to support the first substrate and the second substrate, a plurality of liquid crystals filling a space formed by the first substrate, the second substrate, and the plurality of supporters, a plurality of buffers disposed between the supporters, and a black matrix disposed on the second substrate. The plurality of the supporters includes a plurality of first supporters and a plurality of second supporters. In a direction perpendicular to at least one of the first substrate and the second substrate, a second supporter has a height smaller than a first supporter, and a buffer has a height smaller than the first supporter. An orthogonal projection of the black matrix onto at least one of the first substrate and the second substrate covers an orthogonal projection of the plurality of buffers onto at least one of the first substrate and the second substrate.

It should be noted that the various embodiments in the present specification are described in a progressive manner. Each embodiment is mainly described in terms of differences from the previously described embodiments. The similarities between different embodiments are not repeated, and may be incorporated by references.

Various embodiments have been described to illustrate the operation principles and exemplary implementations. It should be understood by those skilled in the art that the present invention is not limited to the specific embodiments described herein and that various other obvious changes, rearrangements, and substitutions will occur to those skilled in the art without departing from the scope of the invention. Thus, while the present invention has been described in detail with reference to the above described embodiments, the present invention is not limited to the above described embodiments, but may be embodied in other equivalent forms without departing from the scope of the present invention, which is determined by the appended claims.

What is claimed is:

1. A liquid crystal display (LCD) panel, comprising:
a first substrate;
a second substrate;
a plurality of supporters disposed between the first substrate and the second substrate and configured to support the first substrate and the second substrate, wherein, the plurality of the supporters includes a plurality of first supporters and a plurality of second supporters, and in a direction perpendicular to at least one of the first substrate and the second substrate, a second supporter has a height smaller than a first supporter;
a plurality of liquid crystals filling a space formed by the first substrate, the second substrate, and the plurality of supporters;
a plurality of buffers disposed between adjacent supporters, wherein in the direction perpendicular to at least one of the first substrate and the second substrate, a buffer has a height smaller than the first supporter; and
a black matrix disposed on the second substrate, wherein an orthogonal projection of the black matrix onto at least one of the first substrate and the second substrate covers an orthogonal projection of the plurality of buffers onto at least one of the first substrate and the second substrate,
wherein:
in the direction perpendicular to at least one of the first substrate and the second substrate, the buffer has a height smaller than the second supporter;
the buffer is disposed between the first supporter and the adjacent second supporter; and
in the direction perpendicular to at least one of the first substrate and the second substrate, at least one of the plurality of buffers has a height different from other buffers.

2. The LCD panel according to claim 1, wherein:
the plurality of buffers is configured to block a flow of the plurality of liquid crystals.

3. The LCD panel according to claim 1, wherein:
in the direction perpendicular to at least one of the first substrate and the second substrate, the height of the plurality of buffers disposed on at least one of the first substrate and the second substrate is gradually reduced from a pre-determined position of the LCD panel to a periphery of the LCD panel; and
the pre-determined position of the LCD panel includes a center of at least one of the first substrate and the second substrate.

4. The LCD panel according to claim 1, wherein:
in the direction perpendicular to at least one of the first substrate and the second substrate, the buffer has a cross section in a rectangular or an oval shape.

5. The LCD panel according to claim 1, wherein:
the first substrate is an array substrate; and
the second substrate is a color film substrate.

6. The LCD panel according to claim 1, wherein:
the buffer is made of polystyrene or photoresist.

7. The LCD panel according to claim 1, wherein:
on a plane parallel to at least one of the first substrate and the second substrate, the buffer has a striped shape; and
a distance or width between two adjacent buffers in parallel is greater than or equal to a width of one sub-pixel.

8. A liquid crystal display (LCD) panel, comprising:
a first substrate;
a second substrate;
a plurality of supporters disposed between the first substrate and the second substrate and configured to support the first substrate and the second substrate, wherein, the plurality of the supporters includes a plurality of first supporters and a plurality of second supporters, and in a direction perpendicular to at least one of the first substrate and the second substrate, a second supporter has a height smaller than a first supporter;
a plurality of liquid crystals filling a space formed by the first substrate, the second substrate, and the plurality of supporters;
a plurality of buffers disposed between adjacent supporters, wherein in the direction perpendicular to at least one of the first substrate and the second substrate, a buffer has a height smaller than the first supporter; and
a black matrix disposed on the second substrate, wherein an orthogonal projection of the black matrix onto at least one of the first substrate and the second substrate covers an orthogonal projection of the plurality of buffers onto at least one of the first substrate and the second substrate,
wherein:
on a plane parallel to at least one of the first substrate and the second substrate, the buffer has a striped shape;
a distance or width between two adjacent buffers in parallel is greater than or equal to a width of one sub-pixel;
on the plane parallel to at least one of the first substrate and the second substrate, the plurality of the buffers each has a striped shape and intersects with each other to form a plurality of intersections; and
a supporter is disposed in at least one of the plurality of intersections.

9. The LCD panel according to claim 7, wherein:
on the plane parallel to at least one of the first substrate and the second substrate, there is a pre-determined gap between the buffer and a supporter.

10. The LCD panel according to claim 1, wherein:
on a plane parallel to at least one of the first substrate and the second substrate, the buffer is provided with a dotted shape.

11. The LCD panel according to claim 1, wherein:
the first substrate includes a display region and a non-display region; and
the buffer is disposed in at least one of the display region and the non-display region.

12. A LCD apparatus, comprising a LCD panel, wherein the LCD panel comprises:
a first substrate;
a second substrate;
a plurality of supporters disposed between the first substrate and the second substrate and configured to support the first substrate and the second substrate, wherein,
the plurality of the supporters includes a plurality of first supporters and a plurality of second supporters, in a direction perpendicular to at least one of the first substrate and the second substrate, a second supporter has a height smaller than a first supporter;
a plurality of liquid crystals filling a space formed by the first substrate, the second substrate, and the plurality of supporters;
a plurality of buffers disposed between adjacent supporters, wherein in the direction perpendicular to at least one of the first substrate and the second substrate, a buffer has a height smaller than the first supporter; and
a black matrix disposed on the second substrate, wherein an orthogonal projection of the black matrix onto at least one of the first substrate and the second substrate covers an orthogonal projection of the plurality of buffers onto at least one of the first substrate and the second substrate,
wherein:
in the direction perpendicular to at least one of the first substrate and the second substrate, the buffer has a height smaller than the second supporter;
the buffer is disposed between the first supporter and the adjacent second supporter; and
in the direction perpendicular to at least one of the first substrate and the second substrate, at least one of the plurality of buffers has a height different from other buffers.

13. The LCD apparatus according to claim 12, wherein:
the plurality of buffers is configured to block a flow of the plurality of liquid crystals.

14. The LCD apparatus according to claim 12, wherein:
in the direction perpendicular to at least one of the first substrate and the second substrate, the height of the plurality of buffers disposed on at least one of the first substrate and the second substrate is gradually reduced from a pre-determined position of the LCD panel to a periphery of the LCD panel; and
the pre-determined position of the LCD panel includes a center of at least one of the first substrate and the second substrate.

15. A liquid crystal display (LCD) panel, comprising:
a first substrate;
a second substrate;
a plurality of supporters disposed between the first substrate and the second substrate and configured to support the first substrate and the second substrate, wherein, the plurality of the supporters includes a plurality of first supporters and a plurality of second supporters, and in a direction perpendicular to at least one of the first substrate and the second substrate, a second supporter has a height smaller than a first supporter;
a plurality of liquid crystals filling a space formed by the first substrate, the second substrate, and the plurality of supporters;
a plurality of buffers disposed between adjacent supporters, wherein in the direction perpendicular to at least one of the first substrate and the second substrate, a buffer has a height smaller than the first supporter; and
a black matrix disposed on the second substrate, wherein an orthogonal projection of the black matrix onto at least one of the first substrate and the second substrate covers an orthogonal projection of the plurality of buffers onto at least one of the first substrate and the second substrate,
wherein:
in the direction perpendicular to at least one of the first substrate and the second substrate, at least one of the plurality of buffers has a height different from other buffers.

* * * * *